(12) United States Patent
Gray et al.

(10) Patent No.: US 11,219,203 B2
(45) Date of Patent: Jan. 11, 2022

(54) SECTIONAL CONTROL FOR AIR BOOM SPREADER

(71) Applicant: Salford Group Inc., Salford (CA)

(72) Inventors: Geof J. Gray, Burford (CA); John Mark Averink, Norwich (CA); Bradley William Baker, Stratford (CA); Simon Goveia, Mossley (CA); Jesse Abram Dyck, London (CA); Chad Derek Pasma, Beachville (CA); Adam Peter Lehman, Kenilworth (CA); Christopher Michael Poppe, Mitchell (CA); Troy Michael Straatman, Alvinston (CA)

(73) Assignee: Salford Group Inc., Salford (CA)

( * ) Notice: Subject to any disclaimer, the term of this patent is extended or adjusted under 35 U.S.C. 154(b) by 0 days.

(21) Appl. No.: 17/417,490

(22) PCT Filed: Jan. 13, 2020

(86) PCT No.: PCT/CA2020/050031
§ 371 (c)(1),
(2) Date: Jun. 23, 2021

(87) PCT Pub. No.: WO2020/146937
PCT Pub. Date: Jul. 23, 2020

(65) Prior Publication Data
US 2021/0386052 A1     Dec. 16, 2021

Related U.S. Application Data

(60) Provisional application No. 62/793,698, filed on Jan. 17, 2019.

(51) Int. Cl.
*A01C 15/04*     (2006.01)
*A01M 9/00*     (2006.01)
(Continued)

(52) U.S. Cl.
CPC .............. *A01M 9/003* (2013.01); *A01C 15/04* (2013.01); *A01C 15/16* (2013.01); *A01M 9/0076* (2013.01); *A01M 9/0092* (2013.01); *B65G 53/04* (2013.01)

(58) Field of Classification Search
CPC ........ B65G 53/08; B65G 53/40; B65G 53/44; B65G 67/24; B65G 2201/042;
(Continued)

(56) References Cited

U.S. PATENT DOCUMENTS 3,631,825 A * 1/1972 Weiste .................... A01C 15/04
                                                              111/101
4,562,968 A * 1/1986 Widmer ................. A01C 15/04
                                                              239/655
(Continued)

FOREIGN PATENT DOCUMENTS

WO     2018/170594 A1     9/2018

OTHER PUBLICATIONS

International Search Report and Written Opinion dated Apr. 8, 2020 on PCT/CA2020/050031.

*Primary Examiner* — Joseph A Dillon, Jr.
(74) *Attorney, Agent, or Firm* — Brunet & Co. Ltd.; Robert Brunet; Hans Koenig (57) ABSTRACT

A product distribution system for sectional control in an air boom spreader has a solid product metering assembly having: a first endless conveyor and a second endless conveyor for conveying the product from the container to the air system, the first and second endless conveyors substantially parallel to each other, the first conveyor driven independently of the second conveyor; and, a first shaft, a second shaft and a third shaft, the first shaft parallel to, separated from and driven independently of the second shaft, the second shaft parallel to and separated from the third shaft, (Continued)

the first shaft driving the first conveyor, the second shaft driving the third shaft to drive the second conveyor.

11 Claims, 9 Drawing Sheets

(51) Int. Cl.
   *B65G 53/04* (2006.01)
   *A01C 15/16* (2006.01)
(58) Field of Classification Search
   CPC .......... B65G 2812/02148; A01C 7/042; A01C 7/044; A01C 7/046; A01C 7/081; A01C 7/082; A01C 7/084; A01C 15/04; A01C 15/16; A01M 9/003; A01M 9/0092
   USPC .................................................. 111/174, 175
   See application file for complete search history.

(56) References Cited

U.S. PATENT DOCUMENTS

| | | | | |
|---|---|---|---|---|
| 4,793,742 A * | 12/1988 | Strand | ..................... | A01C 15/04 222/272 |
| 4,852,809 A * | 8/1989 | Davis | ..................... | A01C 15/04 239/654 |
| 5,052,627 A * | 10/1991 | Balmer | ................. | A01C 15/122 239/655 |
| 5,485,962 A * | 1/1996 | Moss | ..................... | A01C 15/04 239/655 |
| 5,775,585 A * | 7/1998 | Duello | .................... | A01C 15/04 239/654 |
| 5,950,933 A * | 9/1999 | Balmer | ................. | A01C 15/122 239/655 |
| 6,491,479 B1* | 12/2002 | Rexius | .................... | A01C 7/081 406/139 |
| 8,543,238 B2* | 9/2013 | Straeter | ..................... | A01C 7/10 700/219 |
| 10,314,226 B2* | 6/2019 | Zimmerman | .......... | B65G 23/06 |
| 10,918,013 B2* | 2/2021 | Gray | ..................... | A01C 15/18 |
| 2010/0038210 A1* | 2/2010 | Cox | ..................... | B65G 15/105 198/460.1 |
| 2014/0352586 A1* | 12/2014 | Straeter | ................. | A01C 21/005 111/171 |
| 2017/0143026 A1* | 5/2017 | Kodali | .................... | A23N 15/04 |
| 2018/0000010 A1 | 1/2018 | Zimmerman et al. | | |
| 2018/0002112 A1* | 1/2018 | Zimmerman | ........ | A01C 15/006 |
| 2018/0002113 A1* | 1/2018 | Drenth | .................... | A01C 19/00 |
| 2018/0343790 A1* | 12/2018 | Roberge | ................. | A01C 15/006 |
| 2020/0384496 A1* | 12/2020 | Gray | .................... | A01C 17/008 |
| 2020/0404838 A1* | 12/2020 | Gray | .................... | A01C 15/006 |
| 2021/0219487 A1* | 7/2021 | Pederson | ................ | A01C 15/04 |

* cited by examiner

SECTIONAL CONTROL FOR AIR BOOM SPREADER

CROSS-REFERENCE TO RELATED APPLICATIONS

This application is a national entry of PCT Application PCT/CA2020/050031 filed Jan. 13, 2020 and claims the benefit of United States Provisional Patent Application U.S. Ser. No. 62/793,698 filed Jan. 17, 2019, the entire contents of both of which are herein incorporated by reference.

FIELD

This application relates to agriculture, in particular to an air boom spreader equipped with sectional control for selectively delivering solid agricultural product to a field.

BACKGROUND

Air boom spreaders are well known in the art for delivering liquid or solid products (e.g. fertilizers) to an environment (e.g. a field) around the spreader. Air boom spreaders typically comprise one or more boom arms that extend transversely to a direction of travel of the spreader in order to cover a large swath of ground in one pass. Product is delivered from a container by a product distribution system to spaced outlets on the boom arm for delivery to a field.

In many instances, the driving plan of the spreader and/or the layout of the field can cause misapplication of the product to an undesired area. In some cases, there is overlap in certain areas over which a boom arm passes, thereby causing redundant application of the product to those certain areas. In other cases, the spreader may pass close to a non-productive area causing misapplication of the product to the non-productive area. Such misapplications of product lead to greater expense due to product wastage and to uneven results across a field, for example growing results of a crop being fertilized by the spreader. The ability to selectively prevent product application by one or of the outlets, especially without needing to stop the spreader, would help mitigate the problem of misapplication of product to undesired areas.

There remains a need in the art for an air boom spreader having sectional control for selectively delivering product, in particular a solid agricultural product, to areas of a field.

SUMMARY

In one aspect, there is provided an air boom spreader comprising: a frame; a boom arm extendible transversely to a direction of travel of the spreader; a container mounted on the frame for containing a solid product to be delivered to an environment around the spreader; a product distribution system in product communication with the container for receiving the product from the container; and, an air system in product communication with the distribution system for receiving the product from the distribution system, the air system comprising an air line mounted on the boom arm, the air line connecting the product distribution system to a product outlet situated on the boom arm to permit passage of the product from the product distribution system to the environment through the product outlet, and a fan assembly comprising at least a fan, the fan in fluid communication with the air line and operable to create air flow in the air line to transport the product from the product distribution system to the product outlet, wherein the product distribution system comprises at least one endless solid product metering assembly, the solid product metering assembly comprising: a first endless conveyor and a second endless conveyor for conveying the product from the container to the air system, the first and second endless conveyors substantially parallel to each other, the first conveyor driven independently of the second conveyor; and, a first shaft, a second shaft and a third shaft, the first shaft parallel to, separated from and driven independently of the second shaft, the second shaft parallel to and separated from the third shaft, the first shaft driving the first conveyor, the second shaft driving the third shaft to drive the second conveyor.

To drive the conveyors, motors, for example hydraulic, pneumatic or electric motors, or any other suitable drive means may be used. In some embodiments, the metering assembly may comprise a first motor for driving the first shaft to drive the first conveyor. In some embodiments, the metering assembly may comprise a second motor for driving the second shaft to drive the third shaft to drive the second conveyor. In order for the second shaft to drive the third shaft, the second shaft may be connected to the third shaft by a drive linkage. Any suitable drive linkages may be used, for example drive belts, drive chains, toothed gears or combinations thereof. In some embodiments, the metering assembly may comprise a geared linkage between the second shaft and the third shaft. In some embodiments, the geared linkage may comprise a first toothed gear mounted on the third shaft and a second toothed gear mounted on the second shaft, the first and second toothed gears connected by a drive chain.

When more than one metering assembly is present in the spreader, the metering assemblies are generally placed in close proximity, for example side-by-side. For this reason, there is not enough space between metering assemblies to accommodate the presence of a motor. It is an advantage of the present invention that a plurality of motors, for example the first and second motors, may be situated at a same side of the metering assembly. As well, a plurality of drive linkages may be situated at a side of the metering assembly opposite the plurality of motors, for example the first and second toothed gears as well as the drive chain may be situated at the side of the metering assembly opposite the first and second motors. A drive linkage has a slimmer profile than a motor and occupies less space. Therefore, it is possible to include more than one metering assembly to selectively deliver product to different portions of distribution system for selective control of product delivery to the environment. This is not possible, or at least much more difficult, in configurations where the motors are on opposite sides of the metering assembly.

To assist with the configuration of a plurality of motors on the same side of the metering assembly, the metering assembly may comprise split drive rollers and, in some embodiment, split idler rollers. In some embodiments, the metering assembly may comprise a first drive roller for the first conveyor and a second drive roller for the second conveyor, the first drive roller mounted on the first shaft and the second drive roller mounted on the third shaft. In some embodiments the second shaft may be longitudinally separated from the third shaft. In some embodiments, the first shaft may be coaxial with the third shaft.

In some embodiments, the metering assembly further comprises an idler roller mounted around the second shaft. In some embodiments, the metering assembly may comprise a first idler roller for the first conveyor and a second idler roller for the second conveyor, the first and second idler rollers mounted around the second shaft, the first and second idler rollers rotatable independently of each other.

The metering assembly described herein advantageously permits independent operation of endless conveyors within the metering assembly and independent operation of the endless conveyors of adjacent metering assemblies while permitting the adjacent metering assemblies to be close enough together to feed solid product to different closely spaced portions of the product distribution system. The use of multiple individually controllable endless conveyors, each distributing product to fewer portions of the distribution system permits sectional control in an air boom spreader for selectively delivering product to areas of a field.

Further, the arrangement described herein for independently powering two endless conveyors in a single metering assembly can be extended to powering more than two endless conveyors in a single metering assembly. The addition of more motors longitudinally separated on the same side of the metering assembly together with more transversely oriented shafts, appropriate placement of drive and idler rollers on the shafts and appropriate placement of drive linkages between the shafts can permit the use of more than two endless conveyors in a single metering assembly, all the endless conveyors spaced closely enough together to ultimately permit the use of a single independently controlled endless conveyor to feed a single small portion (e.g. a single funnel) of the product distribution system thereby providing very fine sectional control of product delivery to the environment around the air boom spreader.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1A is an isometric view of one embodiment of an air boom spreader of the present invention;

FIG. 1B is a top view of the spreader of FIG. 1A without a cover on a product container;

FIG. 1C is a rear view of the spreader of FIG. 1A;

FIG. 2A is an isometric view of a left-side metering assembly of the spreader of FIG. 1A;

FIG. 2B is a top view of the left-side metering assembly of FIG. 2A;

FIG. 2C is a rear view of the left-side metering assembly of FIG. 2A;

FIG. 2D is a right-side view of the left-side metering assembly of FIG. 2A;

FIG. 3A is an isometric view of a left-hand motor drive assembly of the left-side metering assembly of FIG. 2A;

FIG. 3B is a top view of the left-hand motor drive assembly of FIG. 3A;

FIG. 3C is a rear view of the left-hand motor drive assembly of FIG. 3A;

FIG. 3D is a right-side view of the left-hand motor drive assembly of FIG. 3A;

FIG. 4A is an isometric view of a direct drive motor unit of the left-hand motor drive assembly of FIG. 3A;

FIG. 4B is a top view of the direct drive motor unit of FIG. 4A;

FIG. 4C is a rear view of the direct drive motor unit of FIG. 4A;

FIG. 4D is a right-side view of the direct drive motor unit of FIG. 4A;

FIG. 5A is an isometric view of a chain drive motor unit of the left-hand motor drive assembly of FIG. 3A;

FIG. 5B is a top view of the chain drive motor unit of FIG. 5A;

FIG. 5C is a rear view of the chain drive motor unit of FIG. 5A;

FIG. 5D is a right-side view of the chain drive motor unit of FIG. 5A;

FIG. 6A is a rear view of drive rollers of the left-hand motor drive assembly of FIG. 3A;

FIG. 6B is a sectional view of the drive rollers of FIG. 6A;

FIG. 6C is an exploded view of the drive rollers of FIG. 6A;

FIG. 6D depicts the drive rollers of FIG. 6A showing internal assembly in detail A;

FIG. 6E depicts detail A of FIG. 6D magnified at a scale of 1:2;

FIG. 7A is a rear view of idler rollers of the left-hand motor drive assembly of FIG. 3A;

FIG. 7B is a sectional view of the idler rollers of FIG. 7A;

FIG. 7C is an exploded view of the idler rollers of FIG. 7A;

FIG. 8A is a top view of a tensioner roller assembly of the left-side metering assembly of FIG. 2A;

FIG. 8B is a rear view of the tensioner roller assembly of FIG. 8A;

FIG. 8C is a left-side view of the tensioner roller assembly of FIG. 8A;

FIG. 8D is a rear view of tensioner rollers of the tensioner roller assembly of FIG. 8A;

FIG. 8E is a sectional view of the tensioner rollers of FIG. 8D; and,

FIG. 8F is an exploded view of the tensioner rollers of FIG. 8D.

DETAILED DESCRIPTION

With reference to the Figures and particular reference to FIG. 1A, FIG. 1B and FIG. 1C, one embodiment of an air boom spreader 1 of the present invention comprises a frame 2, a pair of boom arms 3*a*, 3*b* mounted on the frame 2 at a rear of the spreader 1, each of boom arms 3*a*, 3*b* extendible transversely to a direction of travel of the spreader 1, one boom arm 3*a* extendible to the left and the other boom arm 3*b* extendible to the right of the spreader 1. While two boom arms are illustrated, the spreader may comprise 1, 2, 3, 4 or more boom arms if desired. The air boom spreader 1 also comprises a product container 4 mounted on the frame 2, the container 4 comprising at least one hopper for containing a solid product (e.g. fertilizer, herbicide, seed and any other desired granular product) to be delivered to an environment (e.g. a field) around the spreader 1. The container 4 may be covered by a cover 5 if desired, as illustrated in FIG. 1A. The container may comprise 1, 2, 3, 4 or more hoppers, if desired, which can be used to contain different kinds of product, if desired. Wheels (not shown) may be mounted on the frame 2 to facilitate movement of the spreader 1 on the ground. A hitch 6 may be mounted at a front of the frame 2 to permit hitching the spreader 1 to a prime mover, for example a tractor, a truck or the like. However, the air boom spreader may be self-propelled instead, if desired.

The air boom spreader 1 also comprises a product distribution system 10 in product communication with the container 4 for receiving the solid product from the container 4 and an air system 15 in product communication with the distribution system 10 for receiving the product from the distribution system 10 and delivering the product to the environment. The distribution system 10 comprises a left-side endless solid product metering assembly 12 and a right-side endless solid product metering assembly 13. The product metering assemblies 12, 13 extend longitudinally into the container 4 from left and right meter boxes 14a, 14b, respectively, mounted at a rear of the container 4. The left-side endless solid product metering assembly 12 distributes product to the left meter box 14a for delivery to the left side of the spreader 1, and right-side endless solid product metering assembly 13 distributes product to the right meter box 14b for delivery to the right side of the spreader 1. The product metering assemblies 12, 13 receive solid product from the container by gravity and deliver the product to respective meter boxes 14a, 14b. The meter boxes 14a, 14b each comprise a plurality of funnels (not shown) into which the solid product is distributed, preferably evenly, by the product metering assemblies 12, 13 in a manner generally known in the art. The product metering assemblies 12, 13 are operable independently of each other, which permits changing the relative speeds of the metering assemblies 12, 13 and therefore the relative delivery rate of product to each side of the spreader 1. Delivery of the product to one side of the spreader 1 may be achieved by turning off the appropriate metering assembly.

The product metering assemblies 12, 13 are shown parallel and transversely separated in the same horizontal plane; however, the product metering assemblies may be vertically separated as upper and lower product metering assemblies. Further, while the product metering assemblies 12, 13 are shown as being parallel, the product metering assemblies may instead form an angle with each other transporting product in non-parallel directions. Furthermore, while two product metering assemblies are shown, more than two product metering assemblies may be employed, if desired, for example, 3, 4, 5, 6 or more product metering assemblies.

The air system 15 comprises a plurality of air lines 17a, 17b (only two labeled, one on each side of the spreader 1) mounted on the boom arms 3a, 3b, respectively. The plurality of air lines connects the plurality of funnels of the meter boxes of the product distribution system 10 to a plurality product outlets 18a, 18b (only two labeled, one on each side of the spreader 1) situated at regular intervals along the boom arms 3a, 3b to permit passage of the product from the product distribution system 10 to the environment through the plurality of product outlets. A fan assembly 16 comprising at least a fan is in fluid communication with the plurality of air lines and is operable to create air flow in the plurality of air lines to transport the product from the product distribution system 10 to the plurality of product outlets. The fan assembly 16 may further comprise a fan motor for operating the fan, or the fan may be operated by a motor remotely situated on the spreader 1.

With particular reference to FIG. 2A to FIG. 8F, the left-side endless solid product metering assembly 12 will now be described. The right side endless solid product metering assembly 13 is constructed and operates in a similar manner.

The left-side solid product metering assembly 12 comprises a first endless conveyor 21 (e.g. a belt, sometimes called a chain) and a second endless conveyor 22 (e.g. a belt, sometimes called a chain) for conveying the product from the container 4 to the meter boxes 14a, 14b and thence to the air system 15. The first and second endless conveyors 21, 22 are substantially parallel to each other and may have substantially coplanar upper surfaces. The first conveyor 21 is driven independently of the second conveyor 22. The metering assembly 12 further comprises a first motor 23 to drive the first conveyor 21 and a second motor 24 to drive the second conveyor 22. The first and second motors 23, 24 are not coaxial. The first and second motors 23, 24 are longitudinally spaced apart at the same side of the metering assembly 12. The first and second motors 23, 24 are situated at a same side of the metering assembly 12 because there is insufficient space between the left-side solid product metering assembly 12 and the right-side solid product metering assembly 13 to accommodate the presence of a motor. How the two motors 23, 24 can independently drive the two conveyors 21, 22 despite the two motors 23, 24 being on the same side of the metering assembly 12 next to the first endless conveyor 21 is described below.

The first motor 23 is directly attached to a first shaft 25 of a drive roller assembly 30. The drive roller assembly 30 comprises a left sprocketed drive roller 31 seated around and drivingly engaged with the first shaft 25. The left sprocketed drive roller 31 comprises at least one and preferably a plurality of sprockets 32 (only one labeled) that engage with engagement elements on an underside of the first endless conveyor 21 proximate a rear of the first conveyor 21. The engagement elements may be, for example, apertures in or protrusions on the underside of the first endless conveyor 21. Operation of the first motor 23 rotationally drives the first shaft 25, which rotationally drives the left sprocketed drive roller 31, which in turn rotationally drives the first endless conveyor 21.

The second motor 24 is directly attached to a second shaft 26 extending transversely across a width of the left-side solid product metering assembly 12, including across widths of both the first and second endless conveyors 21, 22 at a rear of the solid product metering assembly 12. The second shaft is parallel to, longitudinally separated from and driven independently of the first shaft 25. A geared linkage 40 operatively connects the second shaft 26 to a third shaft 27. The second shaft 26 is parallel to and longitudinally separated from the third shaft 27. The third shaft 27 is part of the drive roller assembly 30 and is coaxial with the first shaft 25. The drive roller assembly 30 comprises a right sprocketed drive roller 33 seated around and drivingly engaged with the third shaft 27. The right sprocketed drive roller 33 comprises at least one and preferably a plurality of sprockets 34 (only one labeled) that engage with engagement elements on an underside of the second endless conveyor 22. Operation of the second motor 24 rotationally drives the second shaft 26, which rotationally drives the third shaft 27, which rotationally drives the right sprocketed drive roller 33 of the drive roller assembly 30, which in turn rotationally drives the second endless conveyor 22. With specific reference to FIG. 6A to FIG. 6E, the drive roller assembly 30 comprises left and right bushings 51, 52, respectively, that support free ends of the first shaft 25 and third shaft 27 within a shaft connector 50. The first shaft 25 and third shaft 27 are able to freely and independently rotate within the shaft connector 50 by virtue of the bushings 51, 52. The roller 31 is drivingly engaged with the first shaft 25 at first engagement structure 55, while the roller 33 is drivingly engaged with the third shaft 27 at second engagement structure 57. A belt separator 54 attached to and extending vertically downward from the shaft connector 50 keeps the first and second endless conveyors 21, 22 from interfering with each other during operation. The shaft connector 50 is seated inside the sprocketed drive rollers 31, 33.

Figures 1A, 1B, 1C:
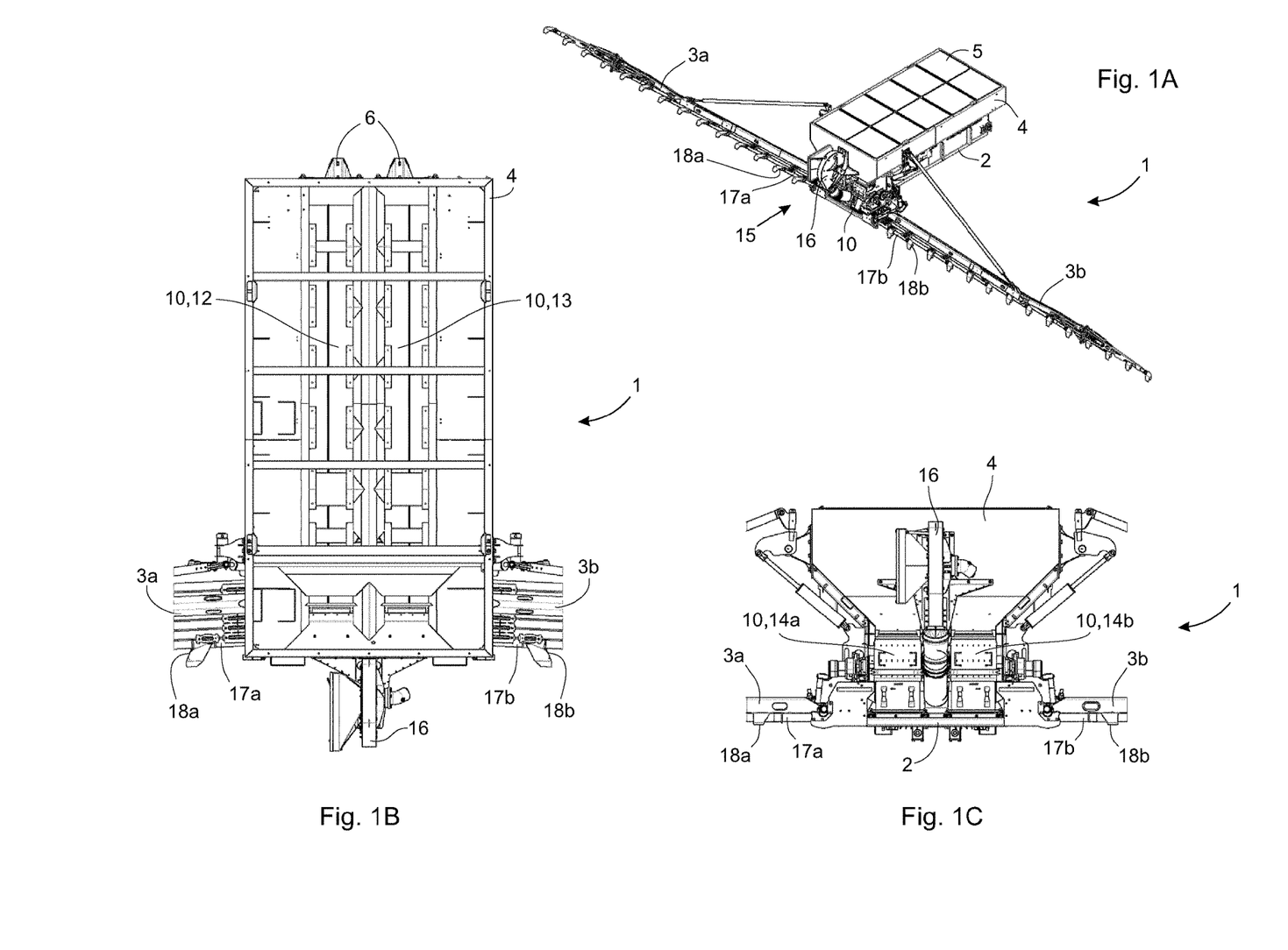

With specific reference to FIG. 5A to FIG. 5D, the geared linkage 40 that operatively connects the second shaft 26 to the third shaft 27 comprises a first toothed gear 41 mounted on the third shaft 27 and a second toothed gear 42 mounted on the second shaft. The first and second toothed gears 41, 42, respectively, are connected by a drive chain 43. The first and second toothed gears 41, 42, respectively, are situated at a side of the metering assembly 12 opposite the first and second motors 23, 24, respectively. Because the geared linkage 40 has a much slimmer profile than the first and second motors 23, 24, it is possible to mount the geared linkage 40 in the narrow space between the left-side and right-side product metering assemblies 12, 13 (see FIG. 1B).

Figure 2A:
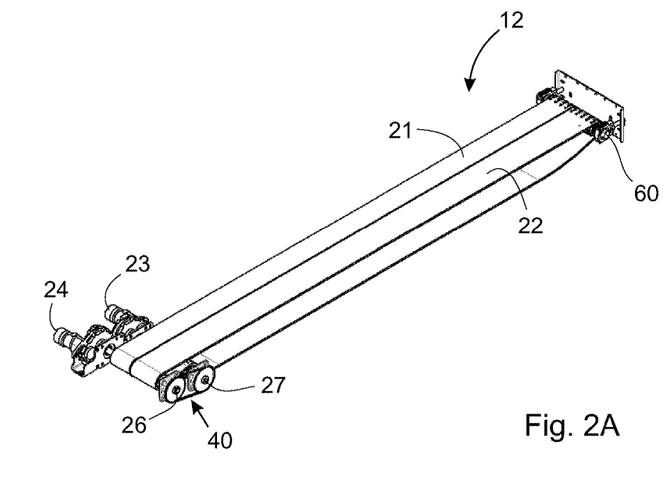
Figure 2B:
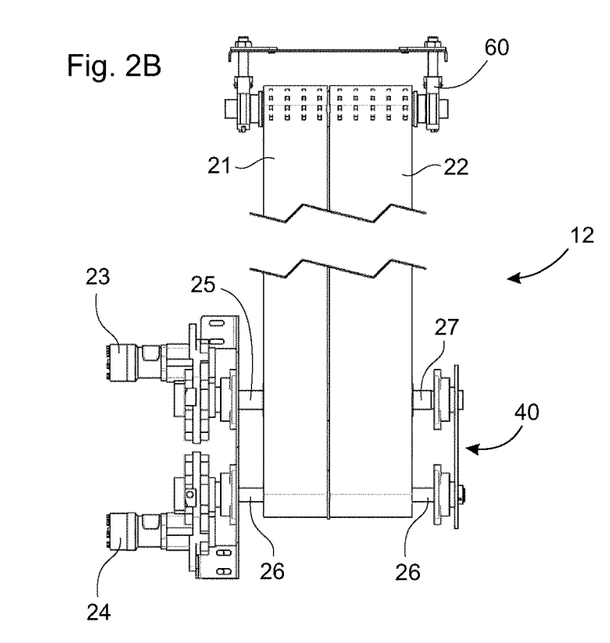
Figure 2C:
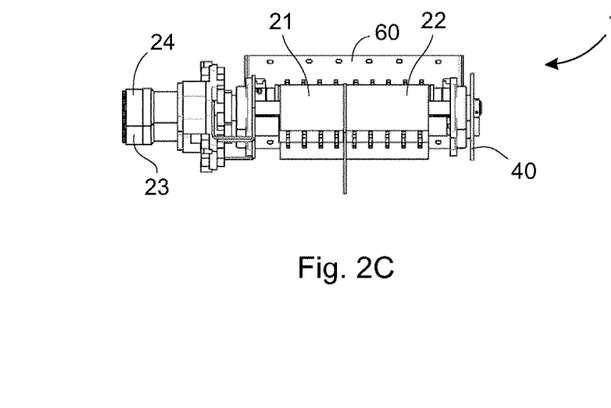
Figure 2D:
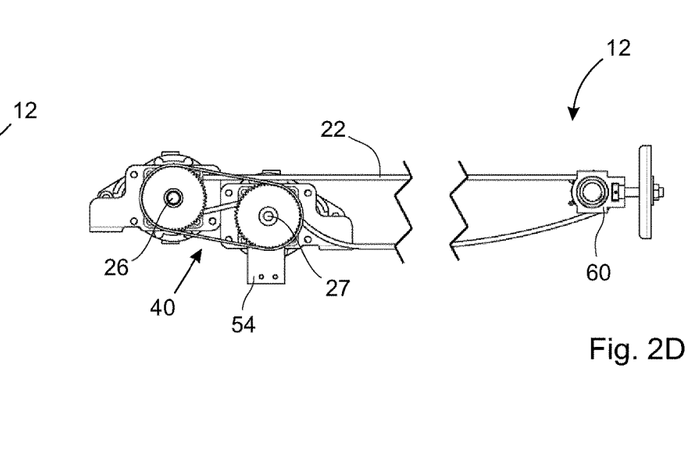
Figure 3A:
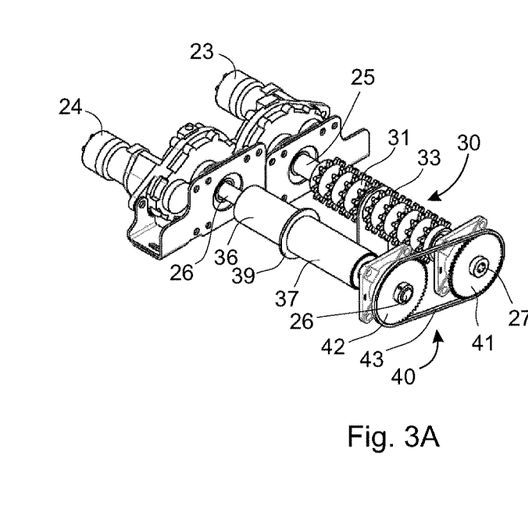
Figure 3B:
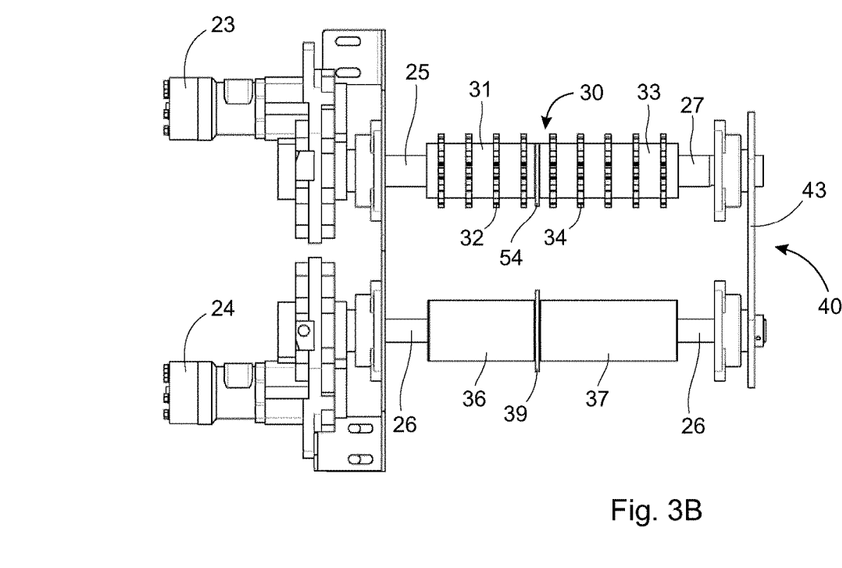
Figure 3C:
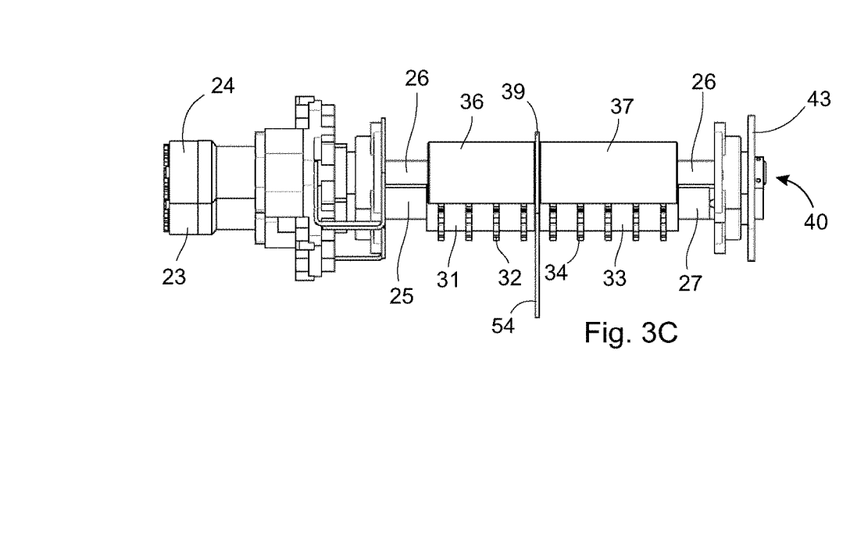
Figure 3D:
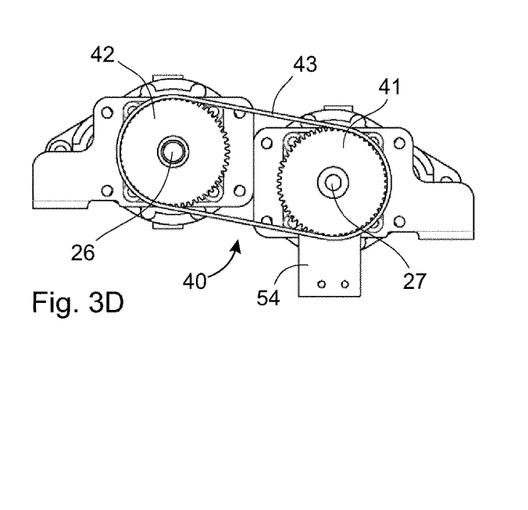
Figures 4A, 4B:
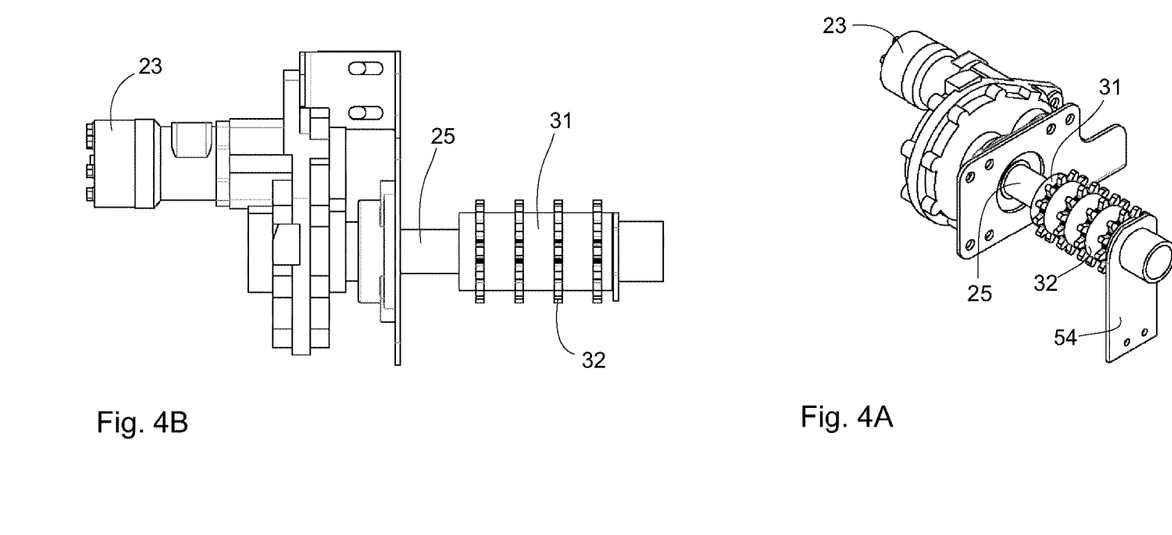
Figure 4C:
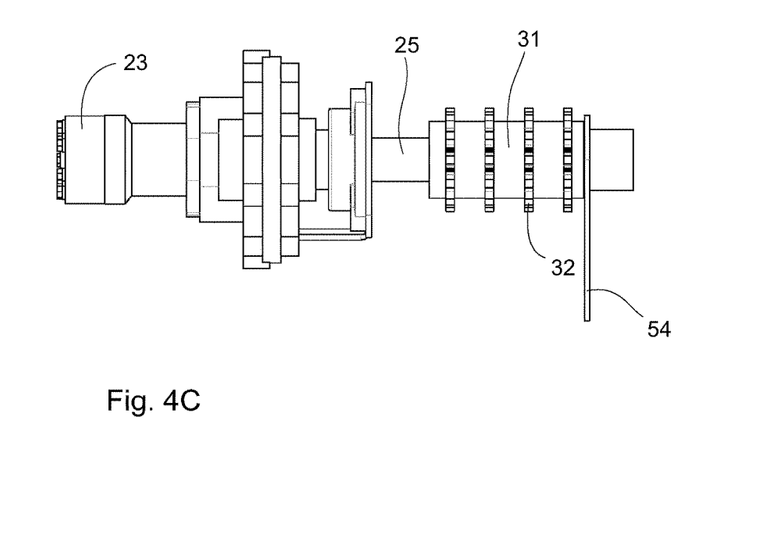
Figure 4D:
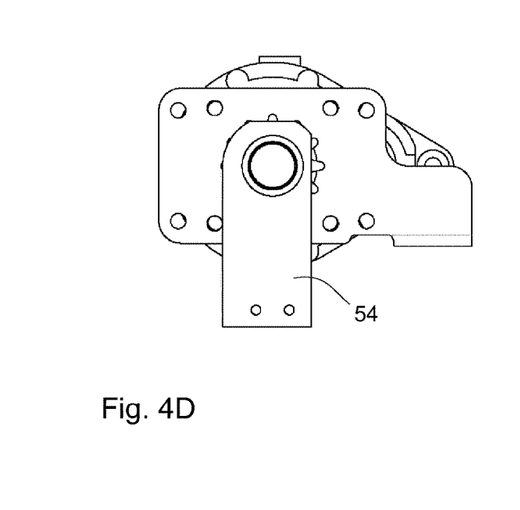
Figure 5A:
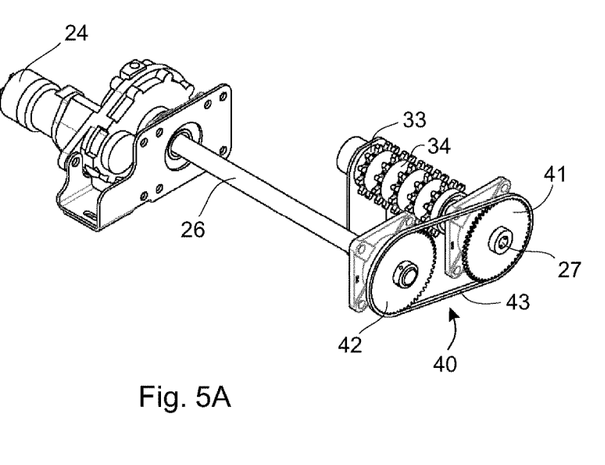
Figure 5B:
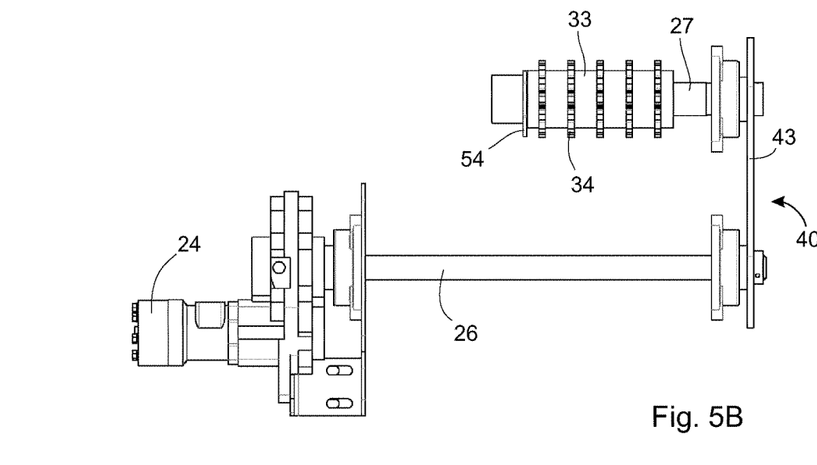
Figure 5C:
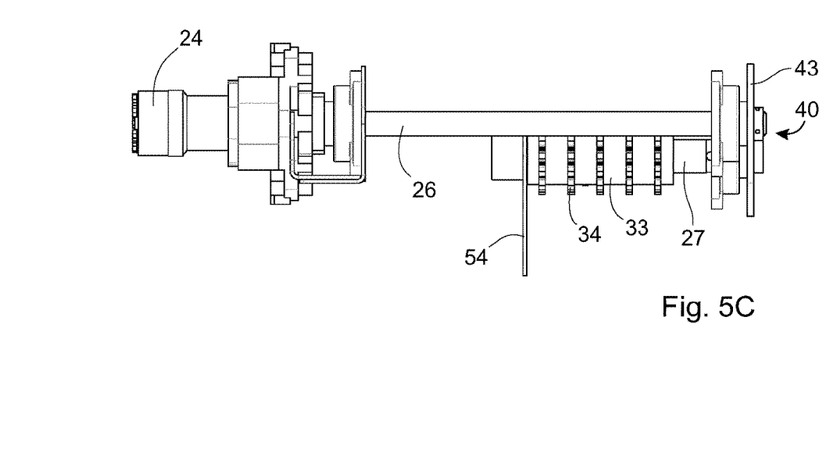
Figure 5D:
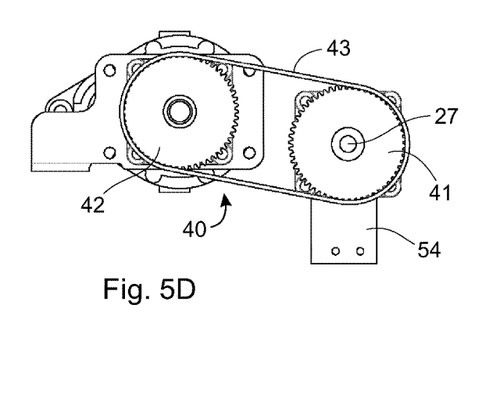
Figure 6A:
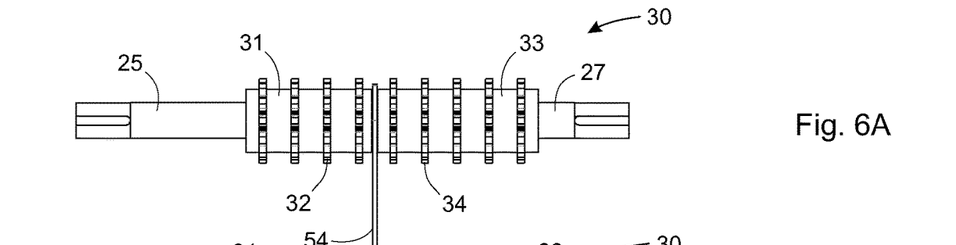
Figure 6B:
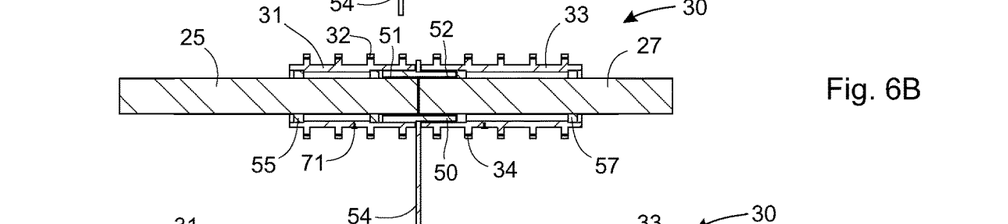
Figure 6C:
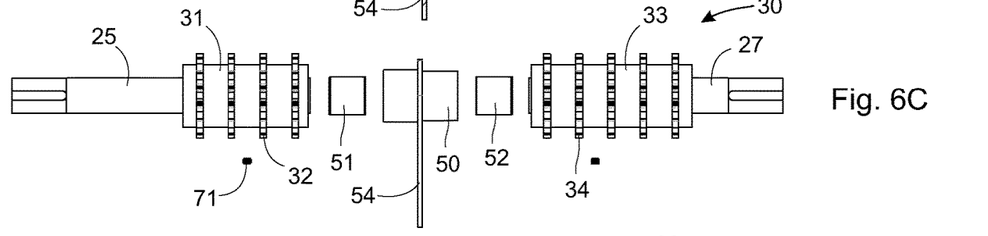
Figure 6D:
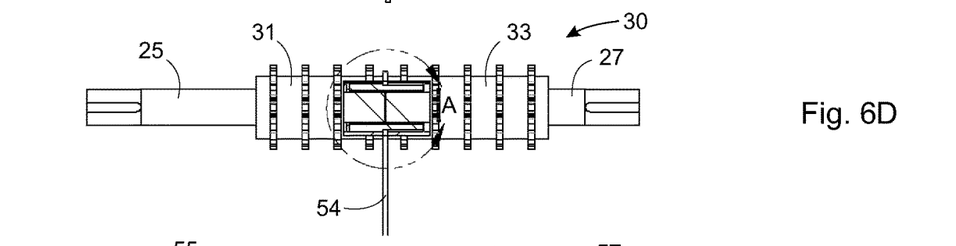
Figure 6E:
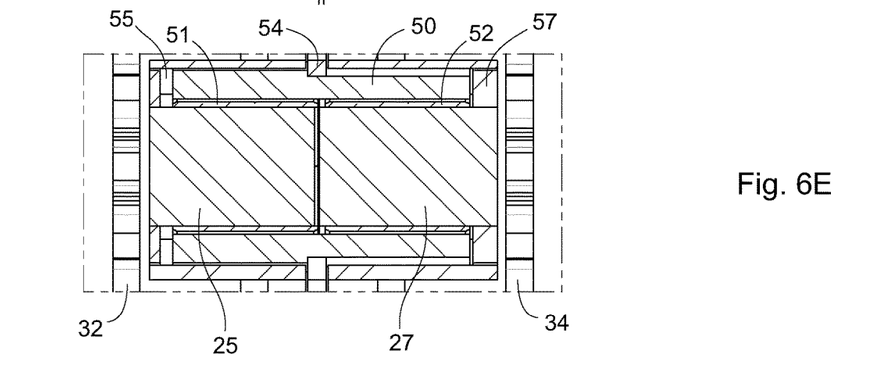
Figure 7A:
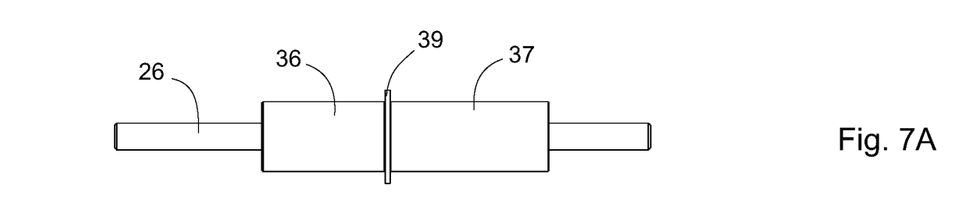
Figure 7B:
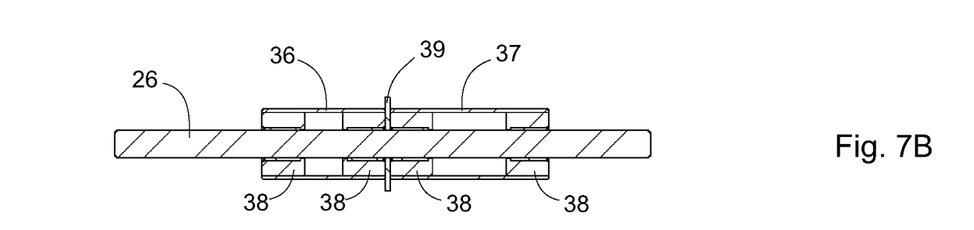
Figure 7C:
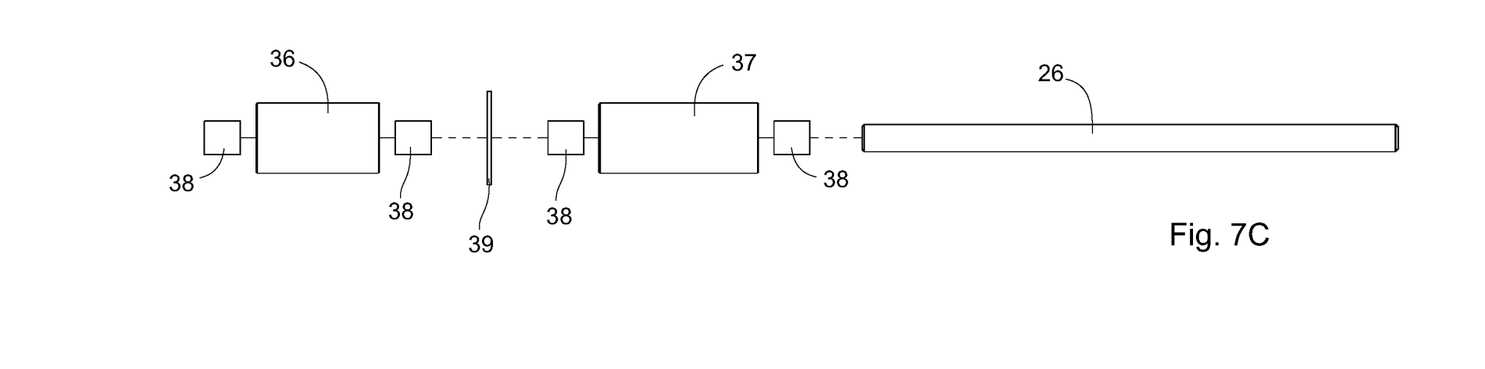
Figure 8A:
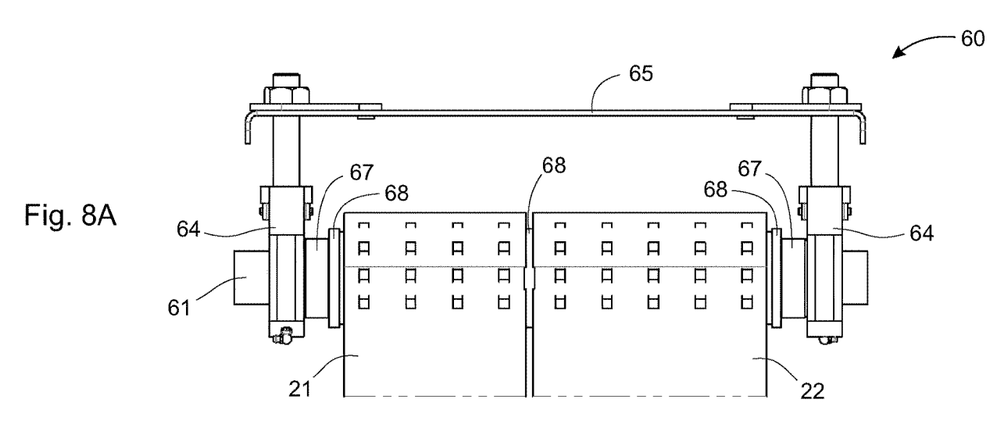
Figure 8B:
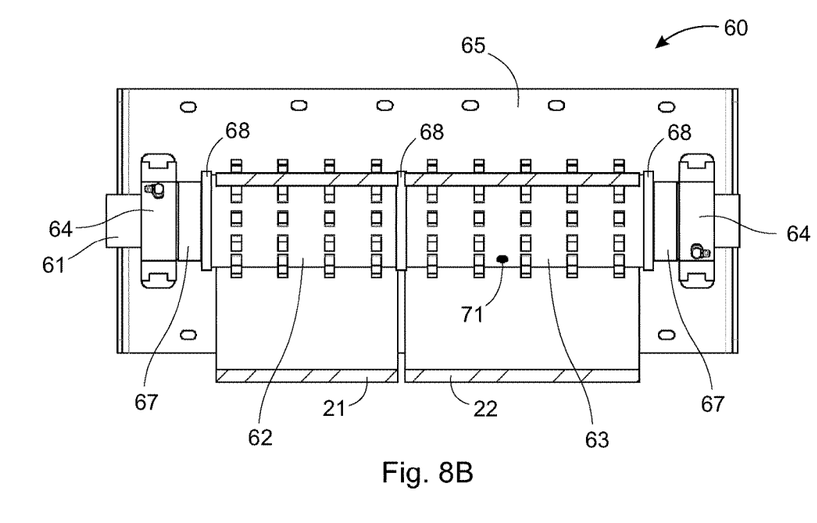
Figure 8C:
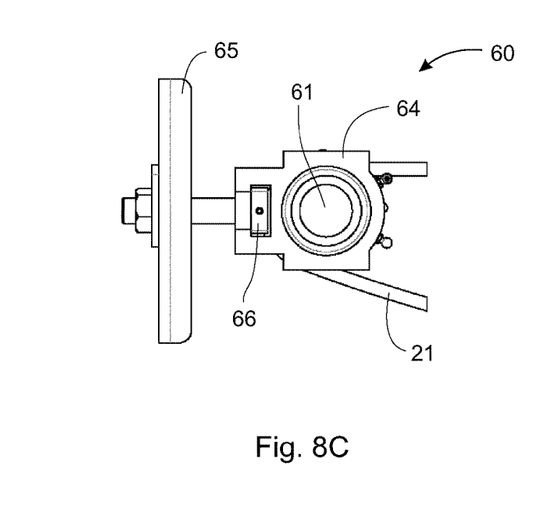
Figure 8D:
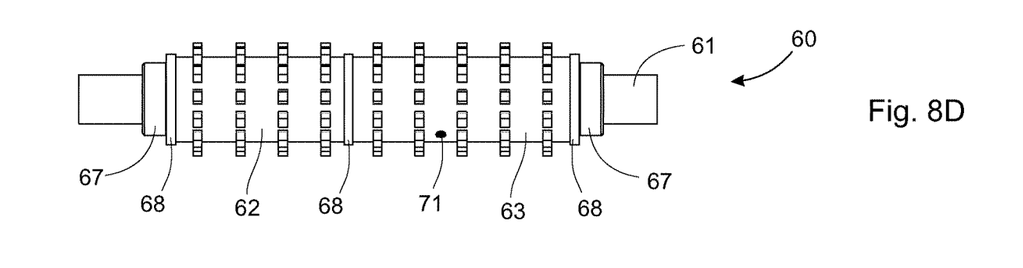
Figure 8E:
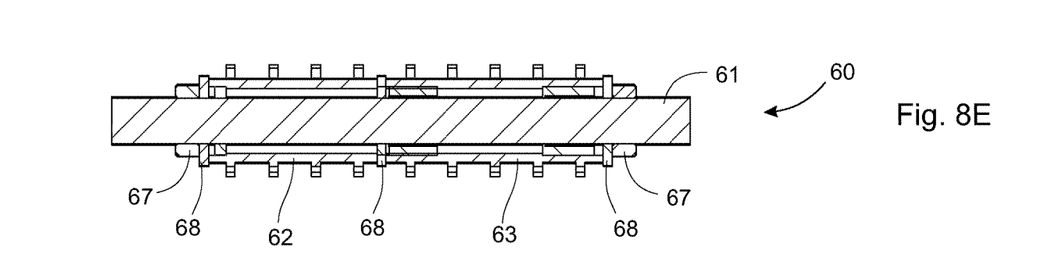
Figure 8F:
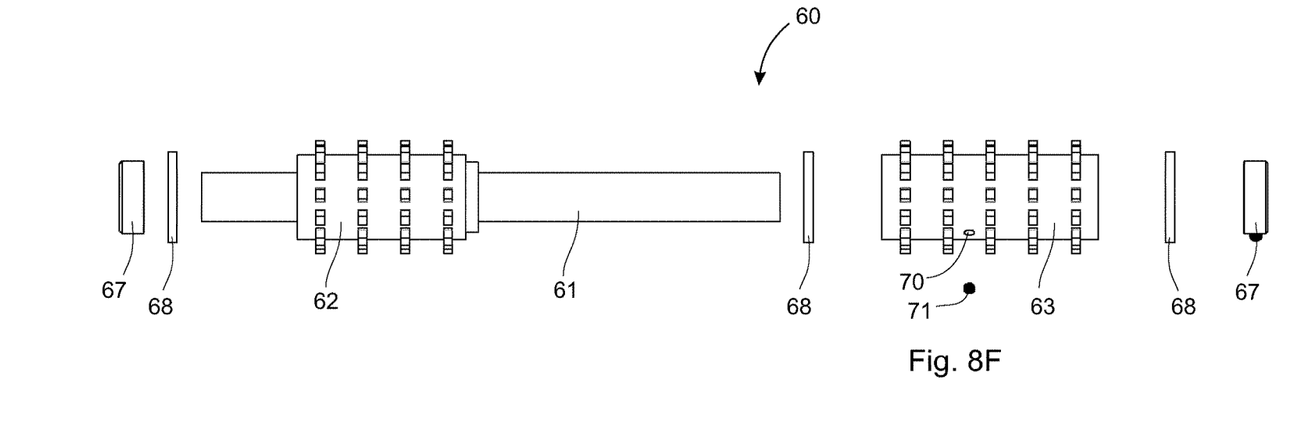

With specific reference to FIG. 7A to FIG. 7C, the second shaft 26 is mounted within a first floating idler roller 36 and a second floating idler roller 37. The second shaft 26 is seated in bushings 38 within the idler rollers 36, 37 so that the second shaft 26 is able to freely rotate within the idler rollers 36, 37 without driving the idler rollers 36, 37, and so that the idler rollers 36, 37 may rotate independently of each other in response to operation of respective first and second endless conveyors 21, 22. A belt separator 39 between the idler rollers 36, 37 helps prevent the first and second endless conveyors 21, 22 from interfering with each other during operation. In this manner, the second motor 24 can drive the second shaft 26 to drive the third shaft 27 to drive the second endless conveyor 22 without interference from the first endless conveyor 21. As seen in FIG. 2A, the second shaft 26 along with first and second idler rollers 36, 37 are situated at the rear end of the metering assembly 12 where the first and second endless conveyors 21, 22 loop around the first and second idler rollers 36, 37, respectively.

At the front end of the metering assembly 12, the metering assembly 12 comprises a tensioner roller assembly 60 around which the first and second endless conveyors 21, 22 loop, as shown in FIG. 8A to FIG. 8F. The tensioner roller assembly 60 comprises a transversely oriented tensioner shaft 61 around a first portion of which a first sprocketed tensioner roller 62 is fixedly mounted and around a second portion of which a second sprocketed tensioner roller 63 is rotatably mounted. The first sprocketed tensioner roller 62 rotates with the tensioner shaft 61, while the second sprocketed tensioner roller 63 freely rotates around the tensioner shaft 61. While the first tensioner roller is shown fixedly mounted, the second tensioner roller could be fixedly mounted instead. In some embodiments, neither of the tensioner rollers may be fixedly mounted on the tensioner shaft. Proximate ends of the tensioner shaft 61, the tensioner shaft 61 is rotatably seated in take-up bearings 64, which are mounted to a mounting plate 65, which is mounted to an inside of a front wall of the container 4. Each of the take-up bearings 64 comprises a threaded bolt and nut arrangement 66, which can be operated to tension the endless conveyors 21, 22. The tensioner roller assembly 60 further comprises belt separators 68 mounted on the tensioner shaft 61 and lock collars 67 proximate each end of the tensioner shaft 61 to hold the rollers 62, 63 and belt separators 68 in place on the tensioner shaft 61.

All rollers may be provided with oil ports 70 (only some shown and labeled) to permit lubricating the various shafts, and the oil ports may be plugged with plugs 71 (only some shown and labeled) to prevent oil leaks.

In some embodiments, the third shaft need not be coaxial with the second shaft, but may instead be longitudinally separated from both the first shaft and the second shaft. All three of the shafts may extend the entire width of the product metering assembly, in which case idler rollers may be mounted around appropriate sections of the first and third shafts. In addition or alternatively, intermediate support structures between the first and second endless conveyors may be used to support ends of the first and/or third shafts.

Further, in embodiments where the first endless conveyor is vertically separated from the second endless conveyor, the first and second shafts are vertically separated, and the second and third shafts are vertically separated, without the need for the second shaft to be longitudinally separated from the first and third shafts. With vertically separated endless conveyors, a fourth shaft is required and idler rollers may be mounted on the second and fourth shafts. With vertically separated endless conveyors, another tensioner roller assembly is required at the front of the metering assembly, one for each endless conveyor.

The metering assembly described herein advantageously permits independent operation of endless conveyors within the metering assembly and independent operation of the endless conveyors of adjacent metering assemblies while permitting the adjacent metering assemblies to be close enough together to feed solid product to different closely spaced funnels in the meter boxes of the product distribution system. The use of multiple individually controllable endless conveyors, each distributing product to fewer funnels permits sectional control in an air boom spreader for selectively delivering product to areas of a field.

Further, the arrangement described herein for independently powering two endless conveyors in a single metering assembly can be extended to powering more than two endless conveyors in a single metering assembly. The addition of more motors longitudinally separated on the same side of the metering assembly together with more transversely oriented shafts, appropriate placement of drive and idler rollers on the shafts and appropriate placement of geared linkages between the shafts can permit the use of more than two endless conveyors in a single metering assembly, all the endless conveyors spaced closely enough together to ultimately permit the use of a single independently controlled endless conveyor to feed a single funnel of the product distribution system. A one-to-one correspondence of endless conveyor to funnel provides for very fine sectional control of product delivery to the environment around the air boom spreader.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An air boom spreader comprising:
   a frame;
   a boom arm extendible transversely to a direction of travel of the spreader;
   a container mounted on the frame for containing a solid product to be delivered to an environment around the spreader;
   a product distribution system in product communication with the container for receiving the product from the container; and,
   an air system in product communication with the distribution system for receiving the product from the distribution system, the air system comprising an air line mounted on the boom arm, the air line connecting the product distribution system to a product outlet situated on the boom arm to permit passage of the product from the product distribution system to the environment through the product outlet, and a fan assembly comprising at least a fan, the fan in fluid communication with the air line and operable to create air flow in the air line to transport the product from the product distribution system to the product outlet,
wherein the product distribution system comprises at least one endless solid product metering assembly, the solid product metering assembly comprising:
  a first endless conveyor and a second endless conveyor for conveying the product from the container to the air system, the first and second endless conveyors substantially parallel to each other, the first conveyor driven independently of the second conveyor; and,
  a first shaft, a second shaft and a third shaft, the first shaft parallel to, separated from and driven independently of the second shaft, the second shaft parallel to and separated from the third shaft, the first shaft driving the first conveyor, the second shaft driving the third shaft to drive the second conveyor.

2. The spreader of claim 1, wherein the metering assembly further comprises a first motor for driving the first shaft to drive the first conveyor and a second motor for driving the second shaft to drive the third shaft to drive the second conveyor, wherein first and second motors are situated at a same side of the metering assembly.

3. The spreader of claim 1, wherein the metering assembly further comprises a geared linkage between the second shaft and the third shaft.

4. The spreader of claim 3, wherein the geared linkage comprise a first toothed gear mounted on the third shaft and a second toothed gear mounted on the second shaft.

5. The spreader of claim 4, wherein the first and second toothed gears are connected by a drive chain.

6. The spreader of claim 2, wherein the metering assembly further comprises a geared linkage between the second shaft and the third shaft, the geared linkage comprises a first toothed gear mounted on the third shaft and a second toothed gear mounted on the second shaft, the first and second toothed gears are connected by a drive chain, and the first and second toothed gears are situated at a side of the metering assembly opposite the first and second motors.

7. The spreader of claim 1, wherein the metering assembly further comprises a first drive roller for the first conveyor and a second drive roller for the second conveyor, the first drive roller mounted on the first shaft and the second drive roller mounted on the third shaft.

8. The spreader of claim 1, wherein the second shaft is longitudinally separated from the third shaft.

9. The spreader of claim 1, wherein the first shaft is coaxial with the third shaft.

10. The spreader of claim 1, wherein the metering assembly further comprises an idler roller mounted around the second shaft.

11. The spreader of claim 1, wherein the metering assembly further comprises a first idler roller for the first conveyor and a second idler roller for the second conveyor, the first and second idler rollers mounted around the second shaft, the first and second idler rollers rotatable independently of each other.

* * * * *